(12) United States Patent
Subramanian et al.

(10) Patent No.: US 11,816,846 B2
(45) Date of Patent: Nov. 14, 2023

(54) MOVEMENT INDICATION

(71) Applicant: Nokia Technologies Oy, Espoo (FI)

(72) Inventors: Mahendran Subramanian, London (GB); Aldo Faisal, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 152 days.

(21) Appl. No.: 17/311,505

(22) PCT Filed: Dec. 3, 2019

(86) PCT No.: PCT/EP2019/083428
§ 371 (c)(1),
(2) Date: Jun. 7, 2021

(87) PCT Pub. No.: WO2020/126459
PCT Pub. Date: Jun. 25, 2020

(65) Prior Publication Data
US 2022/0036567 A1 Feb. 3, 2022

(30) Foreign Application Priority Data
Dec. 19, 2018 (EP) .................................... 18213981

(51) Int. Cl.
*G06T 7/246* (2017.01)

(52) U.S. Cl.
CPC .... *G06T 7/248* (2017.01); *G06T 2207/10016* (2013.01); *G06T 2207/10048* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 9,788,762 B2 | 10/2017 | Auerbach | |
| 2013/0345568 A1* | 12/2013 | Mestha | A61B 5/02405 600/479 |
| 2015/0073283 A1 | 3/2015 | Van Vugt et al. | |
| 2016/0364617 A1 | 12/2016 | Silberschatz et al. | |
| 2018/0053392 A1 | 2/2018 | White et al. | |

(Continued)

FOREIGN PATENT DOCUMENTS

| | | |
|---|---|---|
| EP | 3245943 A1 | 11/2017 |
| WO | 2020/126452 A1 | 6/2020 |

OTHER PUBLICATIONS

Procházka et al., "Extraction of breathing features using MS Kinect for sleep stage detection", Signal, Image and Video Processing, May 3, 2016, 8 pages.

(Continued)

*Primary Examiner* — Vikkram Bali
(74) *Attorney, Agent, or Firm* — ALSTON & BIRD LLP

(57) ABSTRACT

An apparatus, method and computer program is described comprising: receiving video data for a scene; determining a movement measurement for at least some of a plurality of subframes of the video data; weighting the movement measurements to generate a plurality of weighted movement measurements, wherein the weighting is dependent on the subframe; and generating a movement indication for the scene from a combination of some or all of the weighted movement measurements.

20 Claims, 8 Drawing Sheets

(56) References Cited

U.S. PATENT DOCUMENTS

2018/0064369 A1 3/2018 Gunther et al.
2021/0110549 A1* 4/2021 Rubinstein .............. G06T 7/207

OTHER PUBLICATIONS

Yu et al., "Multiparameter Sleep Monitoring Using a Depth Camera", International Joint Conference on Biomedical Engineering Systems and Technologies, Biomedical Engineering Systems and Technologies (BIOSTEC), vol. 357, 2012, 15 pages.
Office Action received for corresponding European Patent Application No. 18213981.6, dated Sep. 7, 2021, 5 pages.
Carney et al., "The Consensus Sleep Diary: Standardizing Prospective Sleep Self-Monitoring", Sleep, vol. 35, No. 2, Feb. 2012, pp. 287-302.
Grandner et al., "Sleep Disturbance is Associated with Cardiovascular and Metabolic Disorders", Journal of Sleep Research, vol. 21, No. 4, 2012, pp. 427-433.
"Dyssomnias", NCBI, Retrieved on Jun. 1, 2021, Webpage available at: https://www.ncbi.nlm.nih.gov/mesh/68020920.
Kelly et al., "Recent Developments in Home Sleep-Monitoring Devices", International Scholarly Research Network ISRN Neurology, vol. 2012, Article ID 768794, 2012, pp. 1-10.
Izadi et al., "KinectFusion: Real-time 3D Reconstruction and Interaction Using a Moving Depth Camera", In Proceedings of the 24th annual ACM symposium on User interface software and technology, Oct. 2011, 10 pages.
Henry et al., "RGB-D Mapping: Using Depth Cameras for Dense 3D Modeling of Indoor Environments", Experimental Robotics, 2014, pp. 1-15.
Miaquet, "The Role of Sleep in Learning and Memory", Science, vol. 294, No. 5544, Nov. 2, 2001, pp. 1048-1052.
Lavigne et al., "Restless Legs Syndrome and Sleep Bruxism: Prevalence and Association Among Canadians", Sleep, vol. 17, No. 8, 1994, pp. 739-743.
Douglas et al., "Clinical Value of Polysomnography", The Lancet, vol. 339, Feb. 8, 1992, pp. 347-350.
Kushida et al., "Practice Parameters for the Indications for Polysomnography and Related Procedures: An Update for 2005", Sleep, vol. 28, No. 4, 2005, 23 pages.
De Souza et al., "Further Validation of Actigraphy for Sleep Studies", Sleep, 26, No. 1, 2003, pp. 81-85.
Ancoli-Israel et al., "The Role of Actigraphy in the Study of Sleep and Circadian Rhythms", Sleep, vol. 26, No. 3, 2003, pp. 342-392.
Sadeh et al., "The Role of Actigraphy in Sleep Medicine", Sleep Medicine Reviews, vol. 6, No. 2, May 2002, pp. 113-124.
Hoque et al., "Monitoring Body Positions and Movements During Sleep using WISPs", Proceeding WH '10 Wireless Health, Oct. 2010, pp. 44-53.
Liao et al., "Video-based Activity and Movement Pattern Analysis in Overnight Sleep Studies", 19th International Conference on Pattern Recognition (ICPR 2008), Dec. 8-11, 2008, 4 pages.
Scatena et al., "An Integrated Video-analysis Software System Designed for Movement Detection and Sleep Analysis. Validation of a Tool for the Behavioural Study of Sleep", Clinical Neurophysiology, vol. 123, No. 2, 2012, pp. 318-323.
Vifstad, "Sleep Movement Analysis using the Microsoft Kinect v1 Depth Sensor", Thesis, May 16, 2016, 95 pages.
Lee et al., "Sleep Monitoring System Using Kinect Sensor", International Journal of Distributed Sensor Networks, vol. 2015, Article ID 875371, 2015, 10 pages.
Gill et al., "A System for Change Detection and Human Recognition in Voxel Space using the Microsoft Kinect Sensor", IEEE Applied Imagery Pattern Recognition Workshop (AIPR), Oct. 11-13, 2011, 8 pages.
Rother et al., "Grabcut: Interactive Foreground Extraction using Iterated Graph Cuts", ACM Transactions on Graphics, vol. 23, No. 3, Aug. 2004, pp. 309-314.
Madadi et al., "Multi-part Body Segmentation based on Depth Maps for Soft Biometry Analysis", Pattern Recognition Letters, vol. 56, Feb. 2015, pp. 1-7.
Palmero et al., "Automatic Sleep System Recommendation by Multi-modal RBG-Depth-Pressure Anthropometric Analysis", International Journal of Computer Vision, vol. 122, No. 2, Apr. 2017, 16 pages.
Smisek et al., "3D with Kinect", IEEE International Conference on Computer Vision Workshops (ICCV Workshops), Nov. 6-13, 2011, pp. 1154-1160.
Nguyen et al., "Modeling Kinect Sensor Noise for Improved 3D Reconstruction and Tracking", 2012 Second International Conference on 3D Imaging, Modeling, Processing, Visualization & Transmission, Oct. 13-15, 2012, pp. 524-530.
Mallick et al., "Characterizations of Noise in Kinect Depth Image: A Review", IEEE Sensors Journal, vol. 14, No. 6, Jun. 2014, pp. 1731-1740.
Essmaeel et al., "Comparative Evaluation of Methods for Filtering Kinect Depth Data", Multimedia Tools and Applications, vol. 74, No. 17, 2015, pp. 7331-7354.
Camplani et al., "Adaptive Spatio-Temporal Filter for Low-Cost Camera Depth Maps", IEEE International Conference on Emerging Signal Processing Applications, Jan. 12-14, 2012, pp. 33-36.
Wasenmuller et al., "Comparison of Kinect V1 and V2 Depth Images in Terms of Accuracy and Precision", Asian Conference on Computer Vision Workshop (ACCV workshop), Nov. 2016, pp. 1-12.
Bylow wt al., "Real-Time Camera Tracking and 3D Reconstruction Using Signed Distance Functions", Robotics: Science and Systems, Jun. 2013, 8 pages.
Min et al., "Depth Video Enhancement Based on Weighted Mode Filtering", IEEE Transactions on Image Processing, vol. 21, No. 3, Mar. 2012, pp. 1176-1190.
Suarez et al., "Hand Gesture Recognition with Depth Images: A Review", IEEE RO-MAN: The 21st IEEE International Symposium on Robot and Human Interactive Communication, Sep. 9-13, 2012, pp. 411-417.
Extended European Search Report received for corresponding European Patent Application No. 18213981.6, dated Mar. 27, 2019, 9 pages.
Nijholt, "Contactless Respiration Monitoring using a 30 Camera System", Thesis, Dec. 2016, 82 pages.
Kempfle et al., "Respiration Rate Estimation with Depth Cameras: An Evaluation of Parameters", Proceedings of the 5th international Workshop on Sensor-based Activity Recognition and Interaction, Sep. 2018, 10 pages.
Bakhtiyari et al., "KinRes: Depth Sensor Noise Reduction in Contactless Respiratory Monitoring", Proceedings of the 11th EAI International Conference on Pervasive Computing Technologies for Healthcare, May 2017, 4 pages.
International Search Report and Written Opinion received for corresponding Patent Cooperation Treaty Application No. PCT/EP2019/083428, dated Jan. 21, 2020, 14 pages.
Office Action received for corresponding European Patent Application No. 18213981.6, dated Feb. 5, 2021, 4 pages.
Office Action for European Application No. 18213981.6 dated Feb. 27, 2023, 4 pages.

* cited by examiner

MOVEMENT INDICATION

RELATED APPLICATION

This application claims priority to PCT Application No. PCT/EP2019/083428, filed on 3 Dec. 2019, which claims priority to European Application No. 18213981.6, filed on 19 Dec. 2018, each of which is incorporated herein by reference in its entirety.

FIELD

This specification relates to generation of a movement indication for a scene based on video data of the scene.

BACKGROUND

Motion data can be extracted from video data. However, there remains a need for alternative arrangements for generating a movement indication for a scene.

SUMMARY

In a first aspect, this specification describes an apparatus comprising: means for receiving video data for a scene; means for determining a movement measurement for at least some of a plurality of subframes (e.g. subdivisions of a frame of video data) of the video data; means for weighting the movement measurements to generate a plurality of weighted movement measurements, wherein the weighting is dependent on the subframe; and means for generating a movement indication for the scene from a combination (such as a sum) of some or all of the weighted movement measurements.

The weighting may be a binary weighting. For example, by providing a binary weighting, some subframes may be ignored when generating a movement indication for a scene from a combination of weighted movement measurements. In some embodiments, the weighting may be non-binary.

The weighting for at least some of said subframes may be at least partially dependent on one or more of: historical movement data for that subframe; a location of the subframe within the scene; and visual characteristics of the scene.

In some embodiments, one or more of the weightings are updated on-the-fly. For example, as movement data is received, weightings may be adjusted. For example, as more movement data for a particular subframe is obtained, historical movement data that might be relevant to the weighting of that subframe may be updated, such that the weighting can be updated in-use or on-the-fly.

In some embodiments, a final generated movement indication may be generated offline, on the basis of movement measurement data that is obtained and weighted on-the-fly (which may, for example, save storage requirements and/or reduce data processing requirements).

The movement measurements for said subframes may comprise an indication of a degree of movement between successive instances of the respective subframes.

In some embodiments, determining the movement measurement for said subframes of the video data may comprise: means for determining a mean distance measurement for the respective subframes of the received video data; and means for determining, for one or more of the mean distance measurements, whether said mean distance measurement differs from a mean distance for a corresponding subframe of a preceding (e.g. immediately preceding) video data frame instance.

The means for determining the movement measurements for said subframes of the video data may determine that a movement has taken place if a mean distance measurement between successive subframes is greater than a threshold value. The threshold may be based on a determined standard deviation threshold (e.g. the threshold may be five standard deviations from the mean).

The video data may comprise depth data for a plurality of pixels of an image of the scene. Moreover, the movement measurements for said subframes of the video data may be determined on the basis of a change in received depth data for the respective subframe. The received depth data may, for example, be determined by computing the mean distance evolution for each subframe.

The video data may be received from a multi-modal camera including an infrared projector and sensor.

The subframes may comprise a regular grid of tiles (such as square tiles); however, many other arrangements are possible. The subframes may have many different shapes and it is not essential to all embodiments for all subframes to have the same shape.

The scene may be a fixed scene. For example, the scene may be captured using a camera having a fixed position and having unchanging direction and zoom.

The means may comprise: at least one processor; and at least one memory including computer program code, the at least one memory and the computer program code configured, with the at least one processor, to cause the performance of the apparatus.

In a second aspect, this specification describes a method comprising: receiving video data for a scene; determining a movement measurement for at least some of a plurality of subframes of the video data; weighting the movement measurements to generate a plurality of weighted movement measurements, wherein the weighting is dependent on the subframe; and generating a movement indication for the scene from a combination (such as a sum) of some or all of the weighted movement measurements. The movement measurements for said subframes may comprise an indication of a degree of movement between successive instances of the subframes.

The weighting may be a binary weighting or a non-binary weighting. Alternatively, or in addition, the weighting for at least some of said subframes may be at least partially dependent on one or more of: historical movement data for that subframe; a location of the subframe within the scene; and visual characteristics of the scene.

In some embodiments, one or more of the weightings are updated on-the-fly/in use.

In some embodiments, determining the movement measurement for said subframes of the video data may comprise: determining a mean distance measurement for the respective subframe of the received video data; and determining, for one or more of the mean distance measurements, whether said mean distance measurement differs from a mean distance for a corresponding subframe of a preceding (e.g. immediately preceding) video data frame instance.

The movement measurements for said subframes of the video data may be determined on the basis of a change in received depth data for the respective subframe. The received depth data may, for example, be determined by computing the mean distance evolution for each subframe.

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receive video data for a scene; determine a movement measurement for at least some of a plurality of subframes of the video data; weight the movement measurements to generate a plurality of weighted movement measurements, wherein the weighting is dependent on the subframe; and generate a movement indication for the scene from a combination (such as a sum) of some or all of the weighted movement measurements.

In a sixth aspect, this specification describes a computer-readable medium (such as a non-transitory computer readable medium) comprising program instructions stored thereon for performing at least the following: receiving video data for a scene; determining a movement measurement for at least some of a plurality of subframes of the video data; weighting the movement measurements to generate a plurality of weighted movement measurements, wherein the weighting is dependent on the subframe; and generating a movement indication for the scene from a combination (such as a sum) of some or all of the weighted movement measurements.

In a seventh aspect, this specification describes an apparatus comprising: at least one processor; and at least one memory including computer program code which, when executed by the at least one processor, causes the apparatus to: receive video data for a scene; determine a movement measurement for at least some of a plurality of subframes of the video data; weight the movement measurements to generate a plurality of weighted movement measurements, wherein the weighting is dependent on the subframe; and generate a movement indication for the scene from a combination (such as a sum) of some or all of the weighted movement measurements.

In an eighth aspect, this specification describes an apparatus comprising: a first input for receiving video data for a scene and/or an imaging device for obtaining video data for a scene; a first control module for determining a movement measurement for at least some of a plurality of subframes of the video data; a second control module for weighting the movement measurements to generate a plurality of weighted movement measurements, wherein the weighting is dependent on the subframe; and a third control module for generating a movement indication for the scene from a combination (such as a sum) of some or all of the weighted movement measurements. At least some of the first, second and third control modules may be combined.

BRIEF DESCRIPTION OF THE DRAWINGS

Examples will now be described, by way of non-limiting examples, with reference to the following schematic drawings, in which.

DETAILED DESCRIPTION

Sleep disorders are associated with many problems, including psychiatric and medical problems. Sleep disorders are sometimes divided into a number of subcategories, such as intrinsic sleep disorders, extrinsic sleep disorders and circadian rhythm based sleep disorders.

Examples of intrinsic sleep disorders include idiopathic hypersomnia, narcolepsy, periodic limb movement disorder, restless legs syndrome, sleep apnea and sleep state misperception.

Examples of extrinsic sleep disorders include alcohol-dependent sleep disorder, food allergy insomnia and inadequate sleep routine.

Examples of circadian rhythm sleep disorders include advanced sleep phase syndrome, delayed sleep phase syndrome, jetlag and shift worker sleep disorder.

Better understanding of sleep physiology and pathophysiology may aid in improving the care received by individuals suffering with such difficulties. Many sleep disorders are primarily diagnosed based on self-reported complaints. Lack of objective data can hinder case understanding and care provided.

Non-contact, discrete longitudinal home monitoring may represent the most suitable option for monitoring sleep quality of a period of time and may, for example, be preferred to clinic-based monitoring as the sleep patterns can vary between days depending on food intake, lifestyle and health status.

Figure 1:
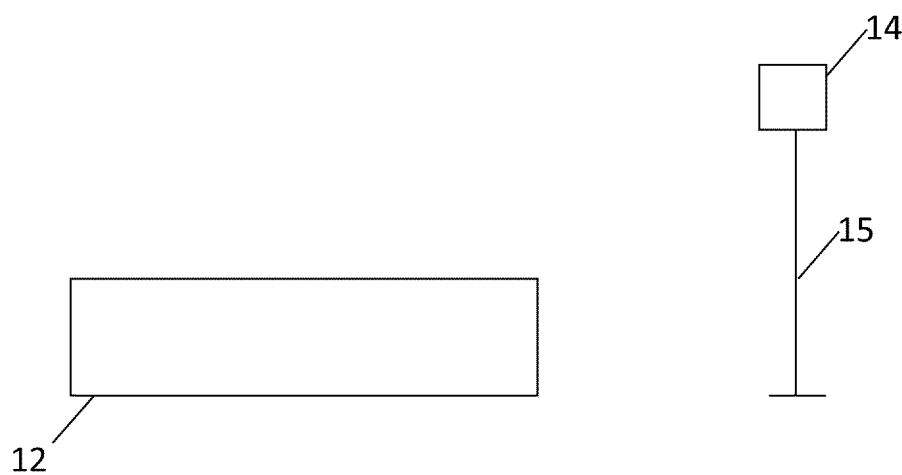
FIG. 1 is block diagram of a system in accordance with an example embodiment.

FIG. 1 is block diagram of a system, indicated generally by the reference numeral 10, in accordance with an example embodiment. The system 10 includes a bed 12 and a video camera 14. The video camera may, for example, be mounted on a tripod 15. As discussed further below, the camera 14 may be a depth camera, although this is not essential to all embodiments.

In the use of the system 10, a patient (or some other subject) may sleep on the bed 12, with the video camera 14 being used to record aspects of sleep quality. The bed 12 may, for example, be in a patient's home, thereby enabling home monitoring, potentially over an extended period of time.

Figure 2:
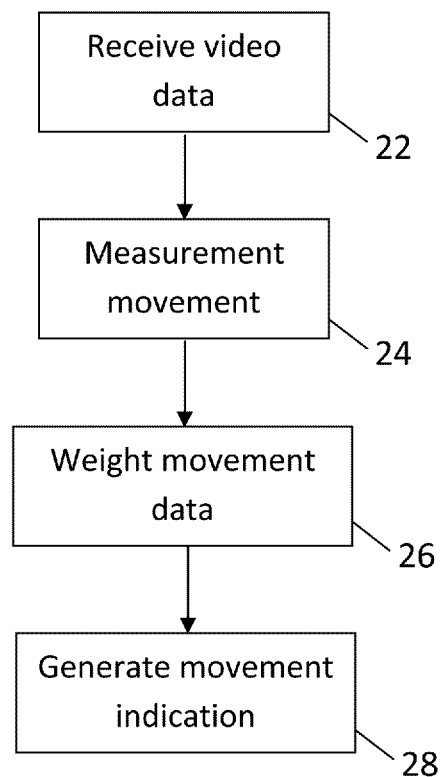
FIG. 2 is a flow chart showing an algorithm in accordance with an example embodiment.

FIG. 2 is a flow chart showing an algorithm, indicated generally by the reference numeral 20, in accordance with an example embodiment.

The algorithm 20 starts at operation 22, where video data is received (for example from the camera 14 described above). In some example embodiments, the camera 14 is a depth camera (e.g. a camera incorporating an RGB-D sensor) such that the video data received in the operation 22 comprises depth data for a plurality of pixels of an image of a scene. An example depth camera may capture per-pixel depth information via infra-red (IR) mediated structured light patterns with stereo sensing or time-of-flight sensing to generate a depth map. Some depth cameras include three-dimensional sensing capabilities allowing synchronized image streaming of depth information. Many other sensors are possible (including video sensors that do not provide depth information).

Figure 3:
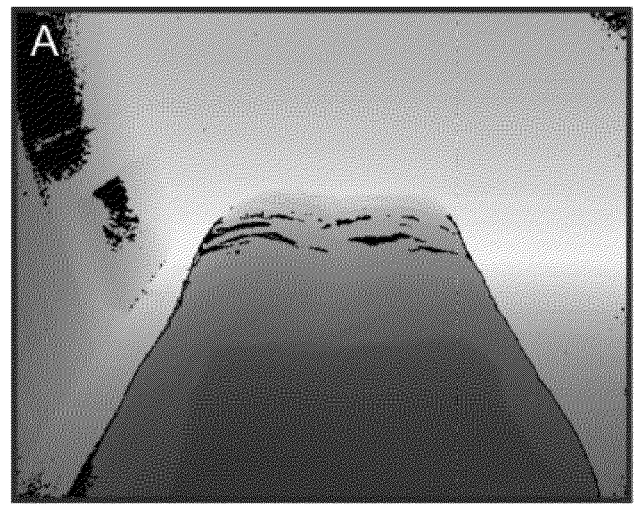
FIG. 3 shows an example output in accordance with an example embodiment.

FIG. 3 shows an example output, indicated generally by the reference numeral 30, in accordance with an example embodiment. The output 30 is an example of video data received in the operation 22 of the algorithm 20.

The video data received in operation 22 may be video data of a scene that is fixed, with the camera in a fixed position and having unchanging direction and zoom. Thus, for example, when a person is sleeping on the bed 12 of the system 10 described above, changes in the video data relate to movement of that person. By providing a fixed scene, changes in the video data (due, for example, to user movement) can be monitored over time (e.g. over several hours of sleep).

Movement measurements are determined at operation 24 of the algorithm 20. For example, movement between successive frames of the video data captured in operation 22 may be determined.

Figure 4:
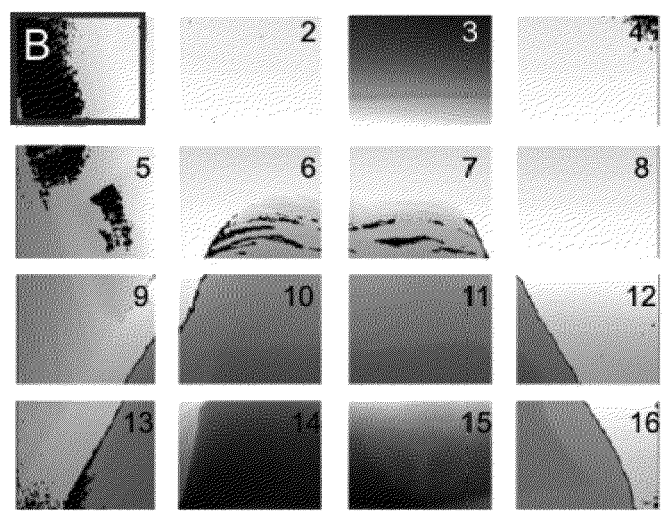
FIG. 4 shows an example output in accordance with an example embodiment.

More specifically, the operation 24 may determine movement measurements for each of a plurality of subframes of the video data. By way of example, FIG. 4 shows an example output, indicated generally by the reference numeral 40, in accordance with an example embodiment. The output 40 shows the data of the output 30 that has been divided into a plurality of subframes (sixteen subframes are shown in the output 40). A subframe is a sub-division of a frame of video data. For example, a frame may be divided into a plurality of subframes. The subframes may be square, but may take on a different form (such as circular shapes or irregular shapes). Moreover, it is not essential for all subframes to have the same shape.

Thus, although the example output 40, comprises subframes in the form of a regular grid of tiles, this is not essential. Other arrangements are possible. The size, shape and/or arrangement of subframes may be different and may be configurable.

The operation 24 may determine movement measurements between successive instances of each subframe. In one example implementation, the successive instances of the subframes were separated by 5 seconds (although, of course, other separations are possible). As discussed further below, the movement measurements for each of the plurality of subframes of the video data may be determined on the basis of a change in the received depth data for the respective subframe (e.g. by computing the mean distance evolution for each subframe). Separating successive instances of the subframes by a period such as 5 seconds even if more subframes are available may increase the likelihood of measurable movement occurring between frames and may reduce the data storage and processing requirements of the system.

The determined movement measurements are weighted at operation 26 to generate a plurality of weighted movement measurements. As discussed in detail below, the weighting may be dependent on the subframe. For example, the weighting for each subframe may be at least partially based on historical movement data for that subframe. Thus, subframes in which movement has occurred in the recent past may have a higher weighting that subframes in which such movement has not occurred.

Finally, a movement indication, based on the weighted movement measurement, is provided in operation 28. By way of example, the operation 28 may determine whether movement is detected in any of the subframes of an instance of the video image. The movement indication may be generated from a combination (such as a sum) of some or all of the weighted movement measurements.

Figure 5:
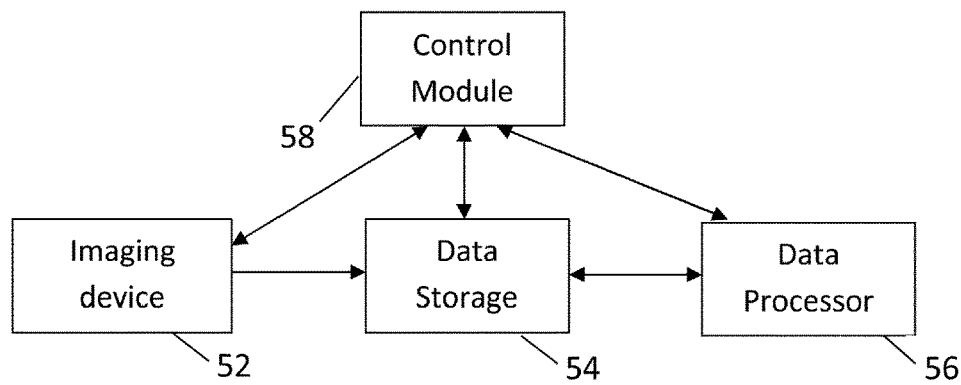
FIG. 5 is block diagram of a system in accordance with an example embodiment.

FIG. 5 is block diagram of a system, indicated generally by the reference numeral 50, in accordance with an example embodiment. The system 50 comprises an imaging device 52 (such as the camera 14), a data storage module 54, a data processing module 56 and a control module 58.

The data storage module 54 may store measurement data (e.g. the output of the operation 24 of the algorithm 20) under the control of the control module 58, with the stored data being processed by data processor 56 to generate an output (e.g. the output of the operation 28 of the operation 20). The output may be provided to the control module 58. In an alternative arrangement, weighted data (e.g. the outputs of the operation 26) may be stored by the data storage module 54, with the stored (weighted) data being processed by data processor 56 to generate an output (e.g. the output of the operation 28 of the operation 20). A potential advantage of storing weighted data is that, in some circumstances, the storage requirements of the weighted data may be less than the storage requirements for the measurement data (particularly if, for example, the weighting is binary weighting).

As discussed further below, the video data received in the operation 22 is typically noisy. The weighting in operation 26 may seek to improve the signal-to-noise ratio of the data in order to seek to improve the quality of the movement indication generated in operation 28. A variety of weighting arrangements are described herein. Those weighting arrangements may be used alone or in any combination.

The weighting in operation 26 may be a binary weighting. Thus, some subframes may be ignored when generating the movement indication (in operation 26). With appropriate weighting, data from some subframes that do not contain useful movement data can be ignored, thereby increasing the overall signal-to-noise ratio. Data having a zero weighting may not need to be stored, potentially reducing both data storage and data processing requirements.

The weighting for a particular subframe may be at least partially dependent on historical movement data for that subframe. For example, subframes where movement has occurred in the past (e.g. in the recent past) may have a higher weighting. In this way, the weighted sum can be biased towards subframes in which movement has occurred in the past (e.g. the recent past). This tends to increase signal-to-noise ratio.

The weighting for a particular subframe may be at least partially dependent on a location of that subframe within the scene. For example, central subframes may have a higher weighting than peripheral subframes (on the assumption that movement is more likely to occur closer to the centre of the image received in the operation 22). This may make sense since an operator of a camera (such as the camera 14) is likely to arrange the system such that a patient or subject on the bed 12 is close to the centre of the images captured by the camera.

The weighting for a particular subframe may be at least partially dependent on visual characteristics of the scene. For example, subframes with surfaces above the level of the bed 12 in the system 10 described above may be weighted higher than subframes with surfaces below the surface on the bed (on the assumption that movement is more likely to occur above the level of the bed than below the level of the bed).

The weighting for a particular subframe may change over time. For example, as more movement data for a particular subframe is obtained, the "historical movement data" that might be relevant to the weighting of that subframe may be updated on-the-fly.

The camera 14 of the system 10 and/or the imaging device 52 of the system 50 may be a multimodal camera comprising a colour (RGB) camera and an infrared (IR) projector and sensor. The sensor may send an array of near infra-red (IR) light into the field-of-view of the imaging device 52, with a detector receiving reflected IR and an image sensor (e.g. a CMOS image sensor) running computational algorithms to construct a real-time, three-dimensional depth value mesh-based video. Information obtained and processed in this way may be used, for example, to identify individuals, their movements, gestures and body properties and/or may be used to measure size, volume and/or to classify objects. Images from depth cameras can also be used for obstacle detection by locating a floor and walls.

In one example implementation, the imaging device was implemented using a Kinect® camera provided by the Microsoft Corporation. In one example, the frame rate of the imaging device 52 was 33 frames per second.

The IR projector and detector of the imaging device 52 may produce depth matrices, where each element of the matrix corresponds to the distance from an object in the image to the imaging device. The depth matrices can be converted to grey images (e.g. the darker the pixel, the closer it is to the sensor). If the object is too close or too far away, the pixels may be set to zero such that they appear black.

Depth frames may be captured by the imaging device 52 and stored in the data storage module 54 (e.g. in the form of binary files). In an example implementation, the data storage 54 was used to record depth frames for subjects sleeping for period ranging between 5 and 8 hours. In one example implementation, the data storage requirement for one night of sleep was of the order of 200 GB.

The stored data can be processed by the data processor 56. The data processing may be online (e.g. during data collection), offline (e.g. after data collection) or a combination of the two. The data processor 56 may provide an output, as discussed further below.

Figure 6:
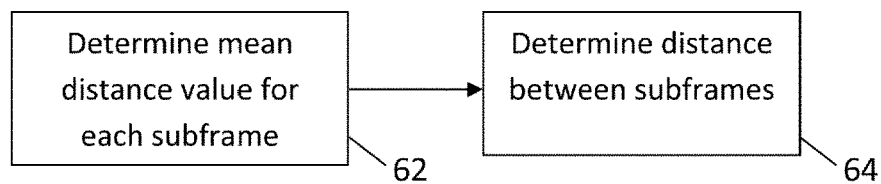
FIG. 6 is a flow chart showing an algorithm in accordance with an example embodiment.

FIG. 6 is a flow chart showing an algorithm, indicated generally by the reference numeral 6o, showing an example implementation of the operation 24 of the algorithm 20, in accordance with an example embodiment. As described above, the operation 24 determines movement between successive frames of the captured video data.

The algorithm 60 starts at operation 62 where a mean distance value for each subframe is determined. Then, at operation 64, distances between subframes (based on the distances determined in operation 62) is determined. As discussed further below, a distance between subframes that is higher than a threshold value may be indicative of movement between successive frames.

By way of example, consider the video data 30 received in an example of the operation 22. A mean distance value between two frames of the video data 30 may be determined by comparing the mean distance value between two consecutive frames. In one example, all the pixels in the matrix were reordered in a vector of length 217088 (424*512), with each row of the depth matrix being placed consecutively in the vector.

After removing all the zero pixels in the frames the mean distance of the frame number i is defined by:

$$M(i) = \frac{1}{N} \times \sum_{k=1}^{N} D(k, i) \qquad (1)$$

Where:
$D \in G \backslash Z$ with
$G = \{$set of pixels in the frame$\}$; and
$Z = \{$set of zero value pixels in the frame$\}$.

Having computed the mean distance of successive frames of a dataset (the operation 62), a determination of movement in the relevant scene can be made (the operation 64).

One method for determining movement is as follows. First, a mean is defined based on the set of all the non-zero value pixels. Next, if the difference between the mean distance of two consecutive frames is above a certain threshold $\theta_1$, a change in position is noticed. This is given by: $M(i) - M(i-1) \geq \theta_1$.

Several values using the standard deviation and maximum difference are tested in order to find the best threshold values (as discussed further below).

Consider now the video data 40 received in an example of the operation 22. A mean distance value may be determined by determining the mean distance of each subframe.

The mean distance of sub frame j in frame number i is defined as:

$$M(i, j) = \frac{1}{N} \times \sum_{k=1}^{N'} D(k, i, j) \qquad (2)$$

Where:
$D \in G' \backslash Z'$ with
$G' = \{$set of pixels in the subframe j$\}$; and
$Z' = \{$set of zero value pixels in the subframe j$\}$.

Now, instead of detecting the movements in the entire frame, we may detect movement in each subframe. If the mean distance between two consecutive subframes differs from a certain threshold $\theta_2$ the algorithm will detect a movement in this sub frame and by consequence in the entire frame. This is given by: $M(i,j) - M(i-1,j) \geq \theta_2$.

Figure 7:
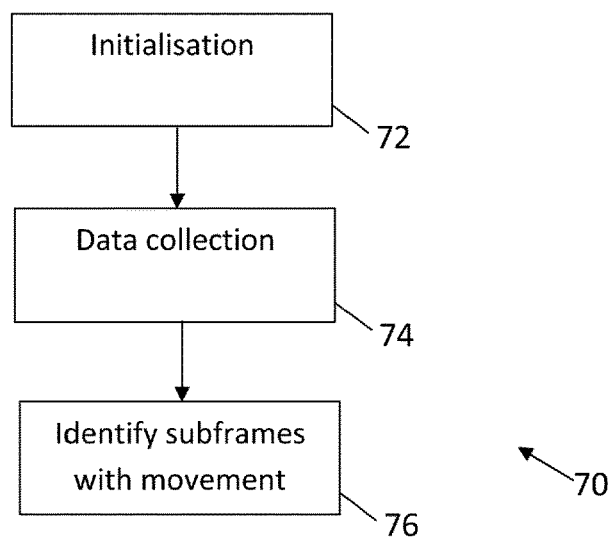
FIG. 7 is a flow chart showing an algorithm in accordance with an example embodiment.

FIG. 7 is a flow chart showing an algorithm, indicated generally by the reference numeral 70, in accordance with an example embodiment. The algorithm 70 starts at operation 72 where an initialisation phase is carried out. The initialisation phase is conducted without a patient (or some other subject) being present (such that there should be no movement detected). As described below, the initialisation phase is used to determine a noise level in the data. Next, at operation 74, a data collection phase is carried out. Finally, at operation 76, subframes (of the data collected in operation 74) having data indicative of movement are identified (thereby implementing the operation 28 of the algorithm 20 described above). The subframes are identified in operation 76 based on a threshold distance level that is set depending on the noise level determined in the operation 72.

Figure 8:
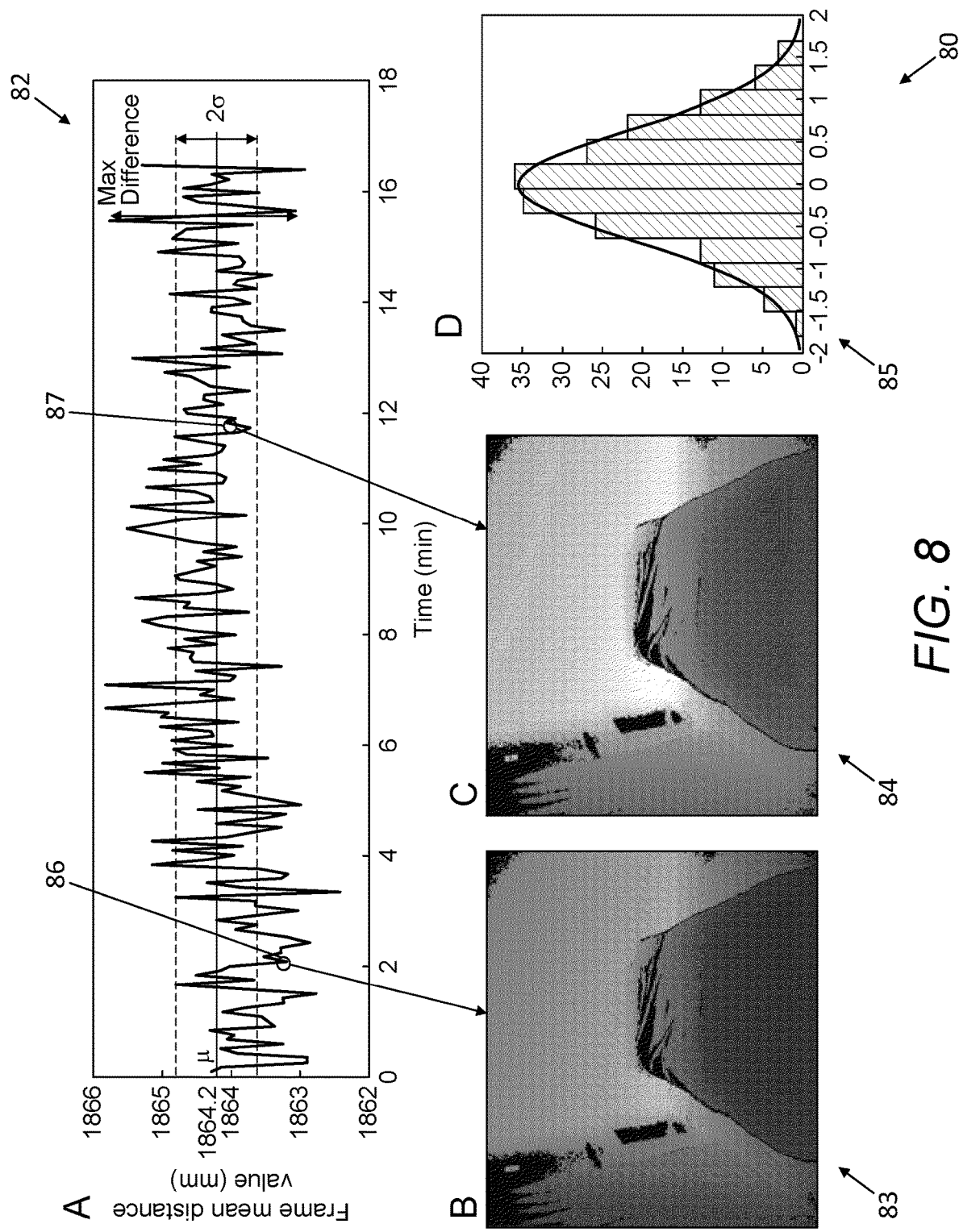
FIG. 8 shows initialisation data in accordance with an example embodiment.

FIG. 8 shows an initialisation data, indicated generally by the reference numeral 80 in accordance with an example embodiment. The initialisation data 80 includes mean distance data 82, a first image 83, a second image 84 and a representation of the noise 85. The first image 83 corresponds to the mean distance data of a data point 86 and the second image 84 corresponds to the mean distance data of a data point 87.

The mean distance data 82 shows how the determined mean frame distance changes over time (a time period of 18 minutes is shown in FIG. 8). As the data 80 was collected without motion (e.g. without a patient or subject being on the bed 12 of the system 10), the variations in the mean distance data 82 are representative of noise. The noise representation 85 expresses the noise as a Gaussian distribution. That distribution can be used to determine a standard deviation for the noise data (as indicated by the standard deviation shown in the data 82). A maximum difference between two consecutive mean values is also plotted on the output 80.

The operation 72 seeks to assess the intrinsic noise in the frames of the output 80. In this way, the intrinsic variation in the data at rest can be determined so that the detection of motion will not be confused by noise. The operation 72 may be implemented using the principles of the algorithm 20 described above. Thus, video data (i.e. the output 82) may be received. Distances in the data 82 can then be determined (see operation 24 of the algorithm) and may be weighted (operation 26 of the algorithm 20).

In the data collection phase 74 of the algorithm 70, the subject goes to sleep and the relevant dataset is collected. Then, in operation 76, the knowledge of the noise is exploited to determine the likelihood that a change in distance data is indicative of actual movement (rather than noise). By way of example, movement may be deemed to have occurred in the event that distance data received in a subframe is more than five standard deviations (as determined in operation 72) away from the previous mean distance.

Experimental Results

An experiment has been conducted on fourteen nights including eleven different subjects in order to validate the reproducibility of the experiment. The data were stored as videos which serve as ground truth. The true detection of movements was manually noted looking at the videos and was compared to the detection of movements provided by the algorithm being tested.

Figure 9A:
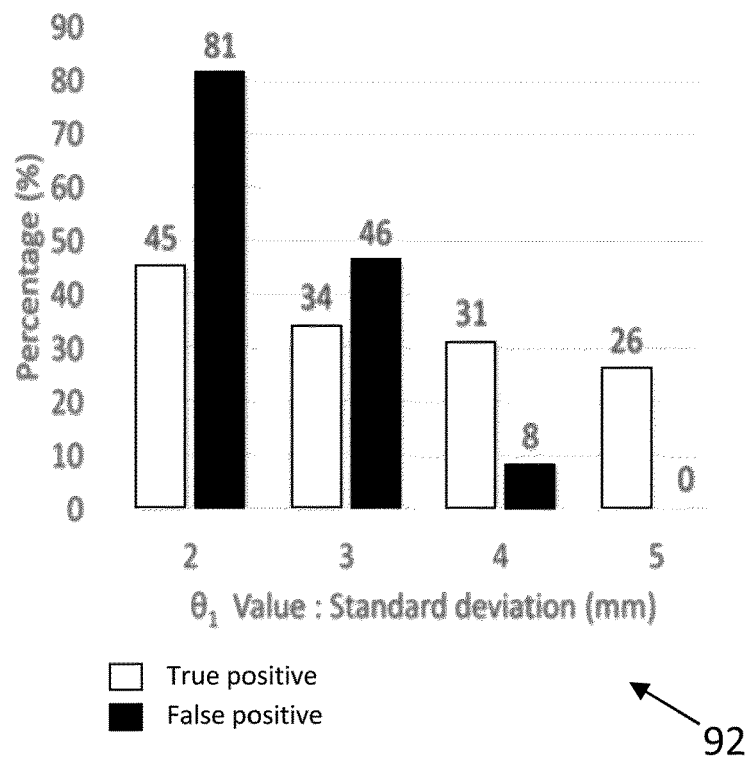
FIGS. 9A and 9B show results in accordance with an example embodiment.
Figure 9B:
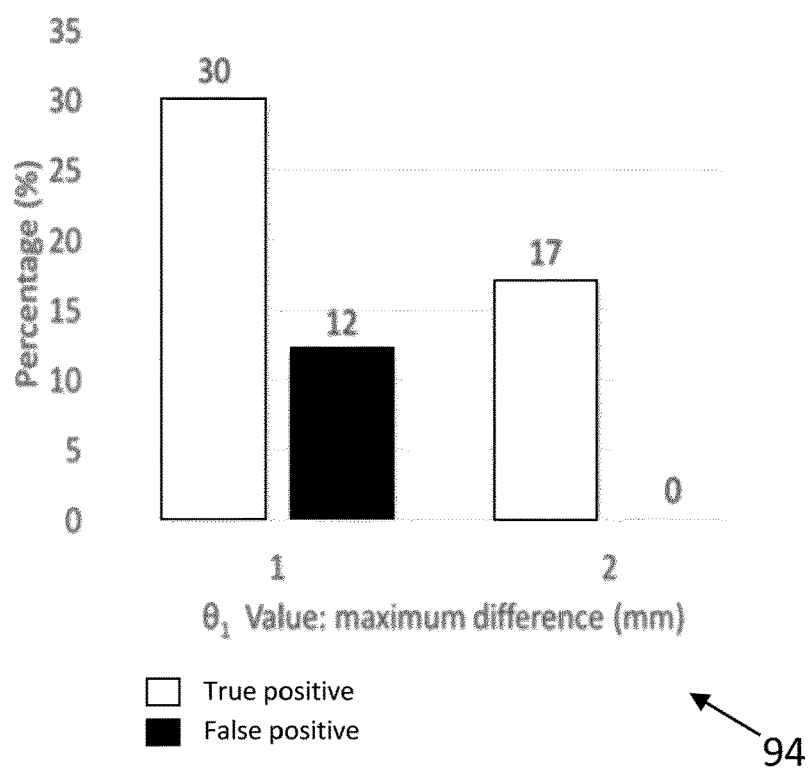

FIGS. 9A and 9B show results, indicated generally by the reference numerals 92 and 94 respectively, in accordance with example embodiments. The results are based on a mean distance evolution (i.e. how the mean distance determinations change over time) for the fourteen subjects. The percent of good detection (true positives) averaging all experiments is shown together with the overestimation of movements (false positives). The results 92 and 94 are based on frames of image data having the form described above with reference to FIG. 3 (i.e. without dividing the frames into subframes).

The results 92 show the number of correct movement identifications (true positives) and the number of false movement identification (false positives) for different standard deviation threshold levels. With the movement threshold at two standard deviations (such that a mean distance change of at least two standard deviations is detected), a true positives measurement of 45% was detected and a false positives measurements of 81% was detected. As the threshold level was increased, the number of false positives reduced (to zero at five standard deviations). However, at five standard deviations, the true positives level had reduced to 26%. Accordingly, the results 92 show poor performance.

The results 102 show the number of correct movement identifications (true positives) and the number of false movement identification (false positives) when using maximum distance differences as the threshold value. The performance was also poor.

Figure 10A:
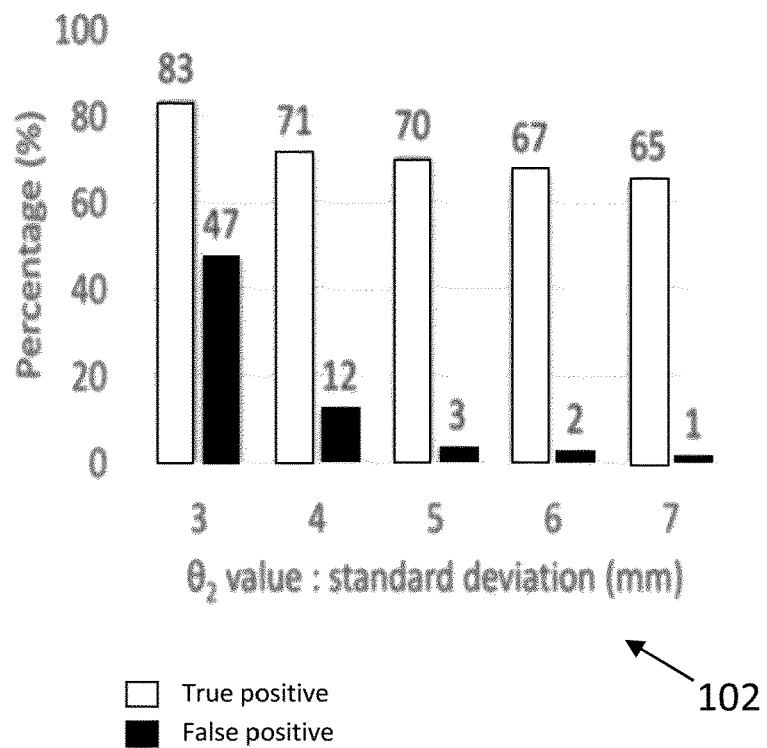
FIGS. 10A and 10B show results in accordance with an example embodiment.
Figure 10B:
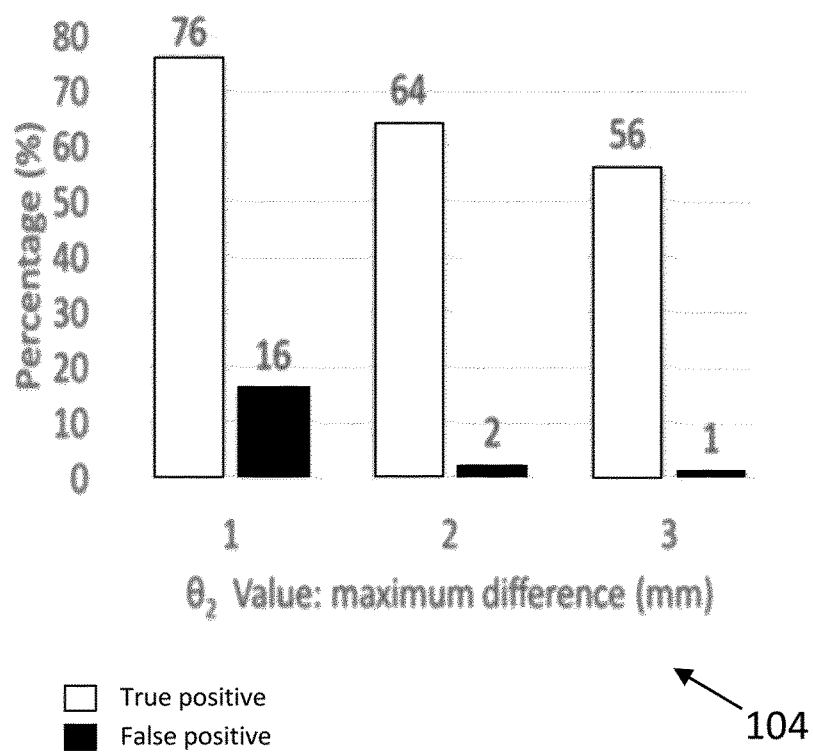

FIGS. 10A and 10B show results, indicated generally by the reference numerals 102 and 104 respectively, in accordance with example embodiments. The results are based on a mean distance evolution for the fourteen subjects. The percent of good detection (true positives) averaging all experiments is shown together with the overestimation of movements (false positives). The results 102 and 104 are based a frames of image data having the form described above with reference to FIG. 4 (i.e. dividing the frames into subframes and considering each subframe separately).

The results 102 show the number of correct movement identifications (true positives) and the number of false movement identification (false positives) for different standard deviation threshold levels. With the movement threshold at five standard deviations, a true positives measurement of 70% was detected and a false positives measurement of 3% was detected. Thus, the results for the subframes arrangement were significantly better than the results for the full frame arrangement described above with reference to FIGS. 9A and 9B. The results 104 show a similarly good performance when using maximum distance differences as the threshold value.

The examples described above generally relate to the use of images from a depth camera in the generation of a movement indication for a scene. This is not essential to all embodiments. For example, changes in subframes of successive video images can be used to determine movement in a scene.

The examples described above generally relate to sleep monitoring in general, and the detection of data relating to sleep disorders in particular. This is not essential to all embodiments. For example, the principles discussed herein can be used to determine movement in a scene for other purposes, for example for tracking movement in video streams for the purposes of detecting the presence of moving animals (i.e. "trail cameras" used in hunting or conservation) or for detecting a moving person for security monitoring purposes.

Figure 11:
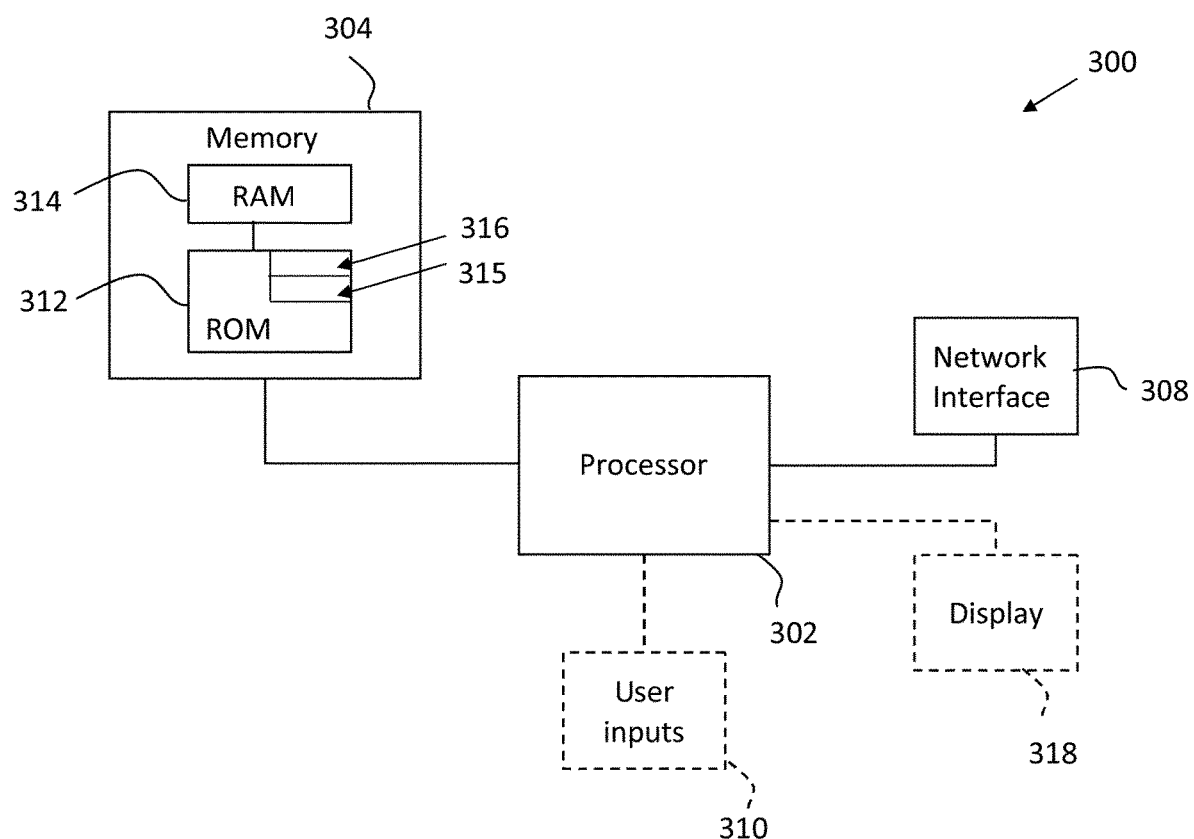
FIG. 11 is a block diagram of components of a system in accordance with an example embodiment.

For completeness, FIG. 11 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 60 and 70 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12A:
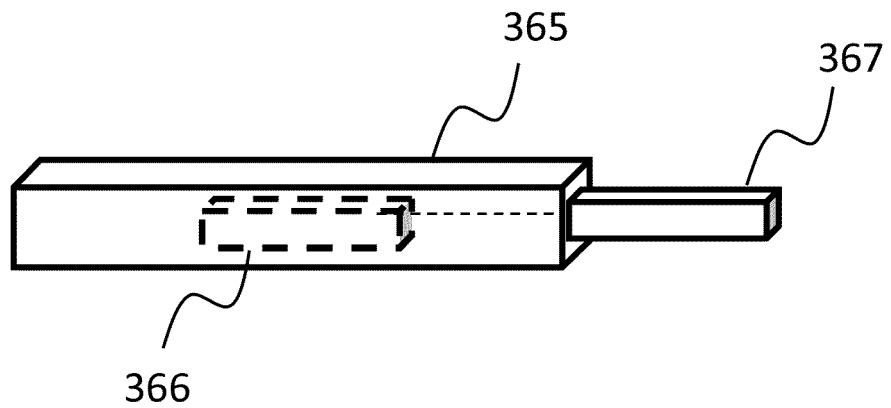
FIGS. 12A and 12B show tangible media, respectively a removable memory unit and a compact disc (CD) storing computer-readable code which when run by a computer perform operations according to example embodiments.
Figure 12B:
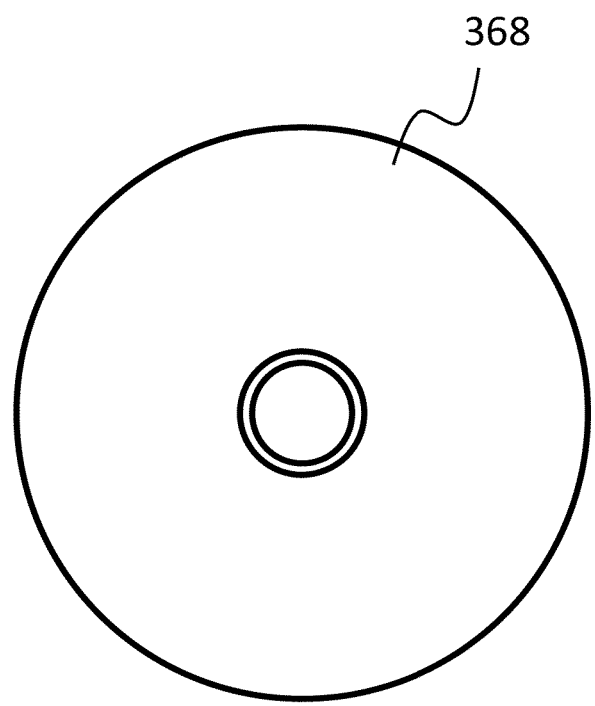

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 6 and 7 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:
at least one processor; and
at least one memory including computer program code;
the at least one memory and the computer program code configured to, with the at least one processor, cause the apparatus at least to perform:
receive video data comprising depth data and a plurality of subframes for a scene;
determine a movement measurement between at least two respective subframes of the plurality of subframes for at least some of the plurality of subframes of the video data, wherein the movement measurement is determined by computing a mean distance evolution for the at least some of the plurality of subframes, and wherein the at least two respective subframes are separated by a predetermined amount of time;
weight the movement measurements to generate a plurality of weighted movement measurements, wherein the weighting is dependent on historical movement data for respective ones of the plurality of subframes; and
generate a movement indication, comprising an indication of whether movement occurred in the video data, for the scene from a combination of some or all of the weighted movement measurements.

2. An apparatus as claimed in claim 1, wherein the weighting is a binary weighting causing one or more subframes determined to not contain useful movement data to be ignored.

3. An apparatus as claimed in claim 1, wherein the weighting for at least some of said subframes is further at least partially dependent on one or both of:
a location of the subframe within the scene; and
visual characteristics of the scene.

4. An apparatus as claimed in claim 1, wherein one or more of the weightings are updated on-the-fly, based on historical data associated with respective ones of the plurality of subframes, as further movement measurements for respective ones of the plurality of subframes are determined.

5. An apparatus as claimed in claim 1, wherein the movement measurements for said subframes comprise an indication of a degree of movement between successive instances of the respective subframes.

6. An apparatus as claimed in claim 1, wherein determining the movement measurement for said subframes of the video data further comprises:
determining, for one or more of the mean distance measurements, whether said mean distance measurement differs from a mean distance for a corresponding subframe of a preceding video data frame instance.

7. An apparatus as claimed in claim 1, wherein determining the movement measurements for said subframes of the video data comprises determining that a movement has taken place if a mean distance measurement between successive subframes is greater than a threshold value.

8. An apparatus as claimed in claim 1, wherein the video data comprises depth data for a plurality of pixels of an image of the scene.

9. An apparatus as claimed in claim 8, wherein the movement measurements for said subframes of the video data are determined on the basis of a change in received depth data for the respective subframe.

10. An apparatus as claimed in claim 1, wherein the video data is received from a multimodal camera including an infrared projector and sensor.

11. An apparatus as claimed in claim 1, wherein the subframes comprise a regular grid of tiles.

12. An apparatus as claimed in claim 1, wherein the scene is a fixed scene.

13. A method comprising:
receiving video data comprising depth data and a plurality of subframes for a scene;
determining a movement measurement between at least two respective subframes of the plurality of subframes for at least some of the plurality of subframes of the video data, wherein the movement measurement is determined by computing a mean distance evolution for the at least some of the plurality of subframes, and wherein the at least two respective subframes are separated by a predetermined amount of time;
weighting the measurements to generate a plurality of weighted movement measurements, wherein the weighting is dependent on historical movement data for respective ones of the plurality of subframes; and
generating a movement indication, comprising an indication of whether movement occurred in the video data, for the scene from a combination of some or all of the weighted movement measurements.

14. A method as claimed in claim 13, wherein the weighting is a binary weighting causing one or more subframes determined to not contain useful movement data to be ignored.

15. A method as claimed in claim 13, wherein the weighting for at least some of said subframes is further at least partially dependent on one or both of:
a location of the subframe within the scene; and
visual characteristics of the scene.

16. A method as claimed in claim 13, wherein one or more of the weightings are updated on-the-fly, based on historical data associated with respective ones of the plurality of subframes, as further movement measurements for respective ones of the plurality of subframes are determined.

17. A method as claimed in claim 13, wherein the movement measurements for said subframes comprise an indication of a degree of movement between successive instances of the respective subframes.

18. A method as claimed in claim 13, wherein determining the movement measurement for said subframes of the video data further comprises:
determining, for one or more of the mean distance measurements, whether said mean distance measurement differs from a mean distance for a corresponding subframe of a preceding video data frame instance.

19. A method as claimed in claim 13, wherein determining the movement measurements for said subframes of the video data comprises determining that a movement has taken place if a mean distance measurement between successive subframes is greater than a threshold value.

20. A non-transitory computer-readable medium comprising program instructions stored thereon for causing an apparatus to perform at least the following:
receiving video data comprising depth data and a plurality of subframes for a scene;
determining a movement measurement between at least two respective subframes of the plurality of subframes for at least some of the plurality of subframes of the video data, wherein the movement measurement is determined by computing a mean distance evolution for the at least some of the plurality of subframes, and wherein the at least two respective subframes are separated by a predetermined amount of time;
weighting the movement measurements to generate a plurality of weighted movement measurements, wherein the weighting is dependent on historical movement data for respective ones of the plurality of subframes; and
generating a movement indication, comprising an indication of whether movement occurred in the video data, for the scene from a combination of some or all of the weighted movement measurements.

* * * * *